United States Patent [19]

Linko et al.

[11] 3,825,984
[45] July 30, 1974

[54] METHOD FOR FABRICATING A HOLLOW BLADE

[75] Inventors: Peter J. Linko; William D. Treece, both of Cincinnati, Ohio

[73] Assignee: General Electric Company, Cincinnati, Ohio

[22] Filed: Mar. 2, 1972

[21] Appl. No.: 231,156

[52] U.S. Cl............... 29/156.8 H, 416/97, 29/490, 416/233
[51] Int. Cl.......................... B21k 3/04, B23p 15/04
[58] Field of Search ........ 29/156.8 H, 490; 416/97, 416/92, 233

[56] References Cited
UNITED STATES PATENTS

| | | | |
|---|---|---|---|
| 1,785,543 | 12/1930 | Dornier | 416/233 |
| 2,342,357 | 2/1944 | Miller | 29/490 |
| 3,088,299 | 5/1963 | McMahon, Jr. et al. | 29/423 |
| 3,094,310 | 6/1963 | Bowmer | 416/92 |
| 3,310,116 | 3/1967 | Saeki et al. | 416/233 |
| 3,551,995 | 1/1971 | Marechal | 29/490 |
| 3,610,811 | 10/1971 | O'Keefe | 29/490 |
| 3,616,125 | 10/1971 | Bowling | 416/97 |
| 3,623,921 | 11/1971 | Behringer et al. | 29/490 |
| 3,626,568 | 12/1971 | Silverstein et al. | 416/232 |
| 3,628,880 | 12/1971 | Smuland | 416/97 |
| 3,628,880 | 12/1971 | Sidenstick et al. | 416/97 |
| 3,628,885 | 12/1971 | Sidenstick et al. | 416/97 |

Primary Examiner—Charles W. Lanham
Assistant Examiner—D. C. Crane
Attorney, Agent, or Firm—Lee H. Sachs; Derek P. Lawrence

[57] ABSTRACT

In the fabrication of a hollow fluid flow apparatus blade, such as a turbine blade or vane, there is provided a pair of spaced apart metallic walls defining the trailing edge portion of the blade airfoil, each of the walls having an inner and an outer surface. Each of the walls is perforated with a plurality of openings which are located from wall to wall in pairs of aligned openings. A pin is positioned through each pair of aligned openings while maintaining the walls in spaced apart relationship. Then the pins are joined to the walls through a metallic bond, one example of which is brazing through application of a brazing alloy to the wall outer surface.

5 Claims, 5 Drawing Figures

PATENTED JUL 30 1974  3,825,984
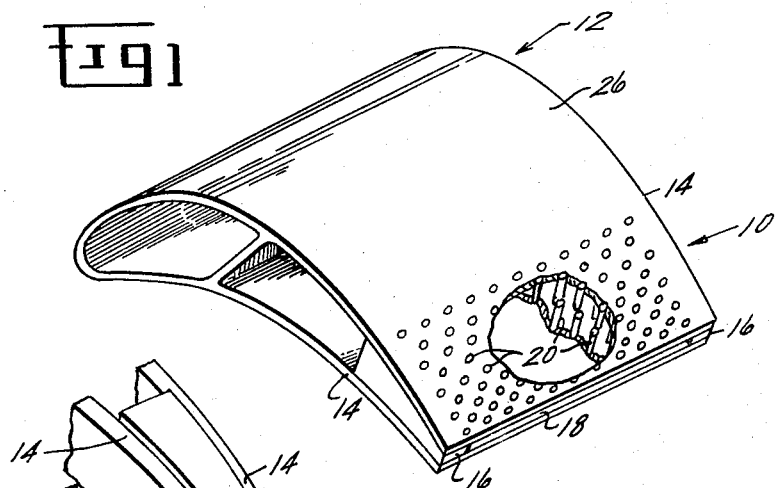
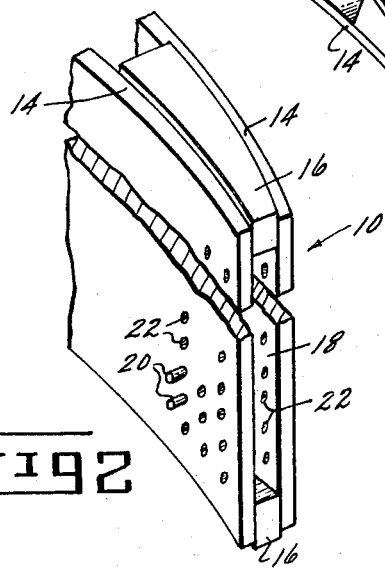
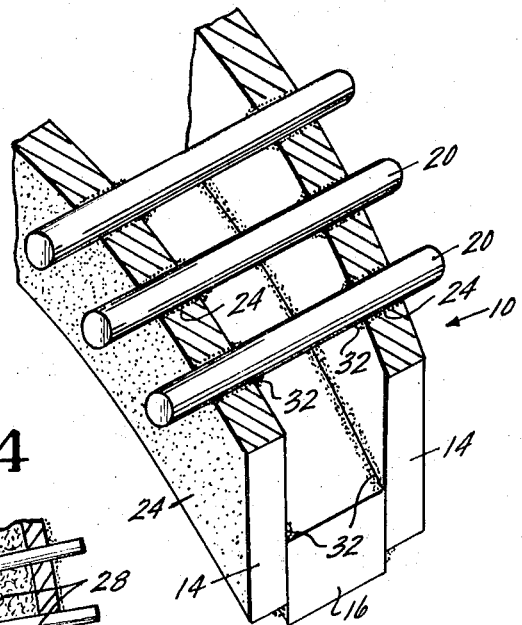
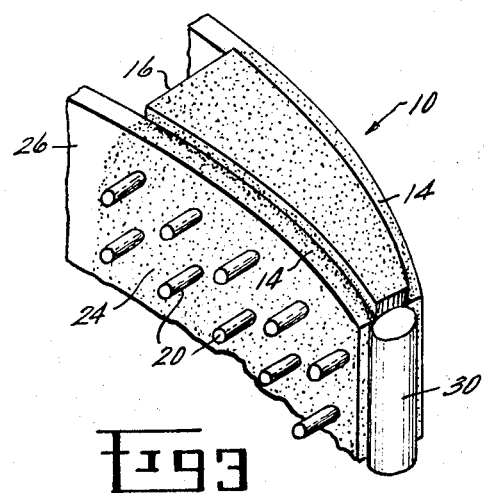
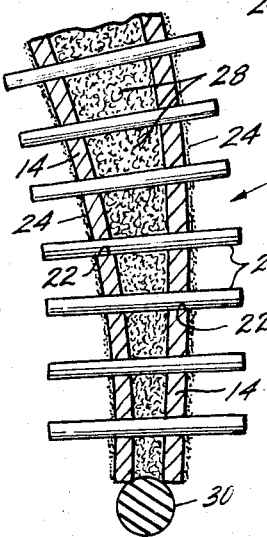

METHOD FOR FABRICATING A HOLLOW BLADE

BACKGROUND OF THE INVENTION

Because of the relatively high temperature operating conditions in the turbine section of modern gas turbine engines, it has been the practice for many years to provide the airfoil of the stationary turbine vanes, and more recently the airfoil of the rotating turbine blades, with internal cooling passages. The most modern of such components include passages which exit through the trailing edge. More particularly with respect to stationary vanes, one fabrication method has involved beinding an alloy sheet into an airfoil configuration with a hollow interior. The sheet generally is joined at the trailing edge to complete such airfoil shaped shell. Trailing edge openings for the discharge of cooling fluid are provided thereafter by various metal removal processes, some examples of which are electro-discharge and electro-chemical drilling. However, use of such metal removal processes adds significantly to the cost of the component being manufactured.

As used herein, the term "blade" shall include fluid directing vanes, blades, nozzles, etc., of airfoil shape for use in fluid flow machines.

SUMMARY OF THE INVENTION

It is a principal object of the present invention to provide an improved method for fabricating a hollow blade having an open trailing edge portion and discrete pins inserted between spaced apart walls of the blade airfoil particularly in its trailing edge portion.

Another object is to provide such a method for fabricating a hollow blade in which the pins are joined with walls of the airfoil by brazing.

Still a further object is to provide such a method in which the brazing alloy is inhibited from filling the spaced apart interior portion of the airfoil between the walls and between the pins.

These and other objects and advantages will be more clearly understood by the following detailed description and drawing, all of which are intended to be representative of rather than limiting on the scope of the present invention.

Briefly, the method of the present invention, in one form, provides for fabrication of a hollow blade including the steps of providing the blade's airfoil with a pair of spaced apart metallic walls which define the trailing edge portion of the airfoil. Each wall has an inner surface and an outer fluid directing surface. Each of the walls is perforated with a plurality of openings located from wall to wall in pairs of aligned openings. A pin is positioned through each pair of aligned openings while the walls are maintained in spaced apart relationship. Thereafter, the pins are joined to the walls through a metallic bond, one example of which is brazing.

In another form of the invention, in order to inhibit capillary flow of the molten brazing alloy into the narrow trailing edge region between the walls and between the pins, a particulate filler material which acts as a brazing "stop-off" material and which is inert at the brazing temperature, is dispersed about the pins in such spaced apart region between the walls. One example of such a material is silica sand or refractory oxides or their mixtures. After heating the brazing alloy, pins and walls at the brazing temperature for time sufficient to braze the pins and the walls, such particulate filler material is removed.

BRIEF DESCRIPTION OF THE DRAWING

FIG. 1 is an isometric, partially sectional view of the airfoil of a turbine vane made in accordance with the present invention;

FIG. 2 is a fragmentary view of the trailing edge portion of the vane with spacers and some pins in position during fabrication;

FIG. 3 is a fragmentary view of the trailing edge portion after brazing alloy has been applied;

FIG. 4 is a fragmentary, sectional view of the trailing edge portion with a particulate stop-off material in position during brazing; and FIG. 5 is a fragmentary, sectional view of the trailing edge portion after brazing and removal of the particulate material.

DESCRIPTION OF THE PREFERRED EMBODIMENTS

Fabrication of hollow airfoil sections useful in the manufacture of turbine vanes includes use of such processes as precision casting, extruding and forming, including bending of sheet metal into an airfoil shell. In many instances, it is desirable to provide for the discharge of cooling air from the trailing edge. When walls of the airfoil have been joined at the trailing edge, it has been necessary to provide trailing edge holes or slots extending into the hollow interior in order to allow discharge of cooling fluid.

One more recent design has included the provision of trailing edge portion walls which do not join at the trailing edge. Instead, they are maintained in spaced apart relationship to provide a trailing edge slot through which cooling fluid is discharged. This type of configuration is shown in the airfoil of FIG. 1.

With reference to FIG. 1, a blade airfoil trailing edge portion, shown generally at 10 of blade 12, is defined by a pair of spaced apart metallic walls 14 maintained in spaced apart relationship by a pair of trailing edge spacers 16 at the top and bottom of the vane. Thus, there is defined a trailing edge slot 18 from which is discharged cooling fluid, such as air, introduced into the hollow interior region between the spaced apart walls 14 in the airfoil.

It has been found advantageous to provide in the trailing edge portion 10, a plurality of pins 20 which act both as cooling fluid turbulence promoters and as heat conductors. Thus, there is promoted better cooling of walls 14 by more efficient heat transfer to the cooling fluid passing through the hollow interior region of the blade. Through practice of the method of the present invention, the cost of manufacturing such a blade has been reduced significantly, for example in one case to about 12 percent of the former cost.

According to one form of the method of the present invention, an airfoil shell is provided, such as by wrapping a sheet metal alloy around a mandrel. The trailing edge portion of such a shell is shown in FIG. 2. Trailing edge spacers 16 are positioned temporarily in the airfoil shell, as shown in FIG. 2, to establish the size of trailing edge slot 18. Then a plurality of openings 22 are perforated through both walls 14 of the shell in a manner such that the openings are aligned wall to wall in pairs of aligned openings, shaped to receive pins. The temporarily inserted trailing edge spacers are then removed and the perforated shell is cleaned to remove foreign surface substances. Such spacers are then repositioned as shown in FIG. 2 and held in place such as by resistance tack welding.

After establishing the spacing between the walls, pins 20 are inserted through aligned openings and, for convenience, are allowed to protrude through both walls as in FIG. 2. As will be described later, a wire can be used to produce such pins. In order to position the pins properly within the openings for subsequent bonding, the pins can be resistance tack welded or they can be held by fixturing or they can be mechanically clipped in a manner which tends slightly to distort or upset the pin. Thus, the pins are inhibited from moving. Each pin preferably is shaped to conform with the shape of the opening, conveniently generally circular in cross section. Further, the pin preferably is sized to provide an interference fit with such an opening.

After positioning the pins in place within the openings provided in the walls of the trailing edge portion of the airfoil shell, the assembled preform, including the trailng edge spacers, is prepared for bonding of the pins and spacers to the walls. The use of a brazing alloy for this purpose has been found to be preferable and economical.

Brazing alloy 24 in FIGS. 3 and 4 is conveniently applied as a powder slurry including a binder of the type generally used in the brazing art and which decomposes at the brazing temperature leaving substantially no residue. Such a slurry is applied to the wall outer fluid directing surfaces 26 of walls 12 about pins 20 and over the exposed, top portions of spacer 14 shown in FIG. 3.

Because of the generally narrow spacing between the walls of the airfoil and between the pins in the trailing edge portion, care must be taken to inhibit flow of the brazing alloy between the walls and between the pins to avoid filling of such region by molten alloy capillary flow. In the preferred form of the present invention, where such close spacing exists, a particulate filler material 28 in FIG. 4, which acts as an internal stop-off material for undesirable brazing alloy flow along vane inner surfaces, is dispersed about the pins in the spaced apart region between the walls prior to brazing. Examples of such an inert material are silica sand or a refractory oxide powder such as alumina, or mixtures of such particulate materials which are inert at the brazing temperature.

Before such a particulate material or mixture 28 is introduced into the spaced apart region between the walls, a baffle or wire 30 in FIGS. 3 and 4 and slightly larger than the trailing edge slot, is secured in position across slot 18, such as by resistance tack welding, to hold the particulate mixture in place within the walls. Then the mixture is introduced between the walls and is dispersed, such as by vibrating, around the pins in order substantially to fill the region between the walls as shown in FIG. 4.

With the pins, brazing alloy and particulate filler material 28 in place as shown in FIG. 4, the airfoil preform thus assembled is heated at the brazing temperature, preferably in vacuum, for a time sufficient to braze the pins and spacers to the walls. During such brazing, capillary flow of the brazing alloy causes it to penetrate the gap between the pins and the walls and the gap between the spacers and the walls to form fillets 32 in FIG. 5 at the juncture of the walls with the spacers and pins. The size of the fillets and the amount of brazing alloy which flows into the cavity within the walls can be controlled by the size and morphology of the particulate filler 28 applied in such cavity. Also, the flow of brazing allow inwardly from the outer walls is a function of the spacing or gap between the pins and the openings in the walls through which the pins penetrate.

After brazing, the airfoil is removed from the furnace and cooled. The particulate material 28 which is still free is mechanically dislodged. That which has been contacted and bonded by the brazing alloy and is more tightly adherent to internal portions of the airfoil can then be removed by chemical means such as by immersion in hydrofluoric acid. After rinsing, the vane can be polished to remove excess brazing alloy and those portions of the pins and spacers protruding from the outer surface and end of the airfoil, as shown in FIG. 5. Any necessary final machining, which can remove baffle or wire 30, can then be conducted.

In one specific example, a nickel base sheet alloy consisting essentially of, by weight, 78 percent Ni, 20 percent Cr with 2 percent $ThO_2$ dispersed in the alloy, sometimes referred to as TD Ni Cr alloy, was formed into an airfoil shaped shell in preparation for the fabrication of a turbine vane. Trailing edge spacers 16 were inserted temporarily into the vane shell as shown in FIG. 2 to establish the desired trailing edge slot, for example about 0.02 inch in width. While held in a fixture, a plurality of openings 22, for example about 0.03 inch in diameter were perforated in a uniform spaced apart pattern through walls of the trailing edge portion of the vane as shown in FIG. 2 by electro-discharge drilling.

The traling edge spacers were removed and the perforated shell was thoroughly cleaned to remove any surface oil, grease, products of machining, etc. Then the trailing edge spacers were repositioned as before and were resistance tack welded into final position for brazing.

A wire, having a nominal diameter of about 0.03 inch and providing an interference fit with the openings 22 in the walls, was used to form the pins 20. The wire was inserted through aligned openings in the walls and clipped to form such pins as shown in FIG. 2. In addition, another wire 30 in FIGS. 3 and 4, slightly larger than the trailing edge slot, for example 0.03 inch in diameter, was welded along the trailing edge slot 18.

A nickel base brazing alloy nominally consisting of, by weight, 16 percent Cr, 4 percent Si, 17 percent Mo, 5 percent W, with the balance essentially nickel and incidental impurities, was mixed into a slurry with an arcylic binder solution commonly used in the art. Such a slurry was then applied to outer wall surface 26 around pins 20 and to the exposed surface of the spacers 16 at the top and bottom of the vane as shown in FIG. 3. The vane preform thus assembled was filled in its trailing edge portion with a particulate mixture 28 including fine white silica sand and alumina particles in proportions of about 80 percent silica sand and 20 percent alumina. The particle size in the range of about 0.003 – 0.012 inch was controlled to the smallest size that would not enter the largest gap between the components to be brazed. The assembly, a portion of which is shown in fragmentary cross section in FIG. 4, was vibrated to compact the particulate mixture and for more complete filling of the internal cavity between walls 14 of the vane.

The vane was then suspended in the position shown in FIG. 4 in a vacuum brazing furnace where it was heated at about 2,350°F for about 4 minutes. Then the vane was removed from the furnace. That portion of the particulate mixture which was still free within the vane was mechanically dislodged and removed. The balanced was leached with hydrofluoric acid at room temperature by immersion for about 12 hours.

After rinsing thoroughly, the wall outer surfaces of each vane in the area of the trailing edge portion about the pins was polished to remove excess brazing alloy and any portion of pins protruding from the surface. Subsequent machining removed wire 30 from the trailing edge slot to provide an opening from the trailing edge into the hollow vane interior.

What is claimed is:

1. In a method for making a hollow blade for fluid flow apparatus, the blade including an airfoil, the steps of:

providing the airfoil with a pair of spaced apart metallic walls defining the trailing edge portion of the airfoil having a hollow interior, each wall having an inner and an outer surface;

perforating each of the walls with a plurality of openings located from wall to wall in pairs of aligned openings;

positioning a pin through each pair of aligned openings and within the hollow interior, while maintaining the walls in spaced apart relationship to define therebetween a slot open at the trailing edge portion and communicating with the hollow interior;

dispersing about the pins, in the hollow interior between the spaced apart walls, a particulate filler material;

joining the pins to the walls through a metallic bond; and then removing the particulate filler material.

2. In the method of claim 1 in which:

the pins are wires having a portion which protrudes from the wall outer surface during joining;

the protruding portions of the wires being removed at the wall outer surface after joining.

3. In the method of claim 1 in which:

a brazing alloy is applied to the outer surfaces of the walls about the pins after positioning of a pin through each pair of aligned openings, the brazing alloy having a brazing temperature less than that which will affect detrimentally the strength properties of the walls; and then joining the pins to the walls by brazing.

4. In the method as in claim 1 in which the size of particles of the particulate filler material are larger than gaps between the pins and the openings in the walls.

5. In a method for making an article having a hollow interior, a gap communicating with the hollow interior, and a plurality of members brazed across the gap therebetween, each member having an outer surface, the steps of:

positioning the plurality of members across the gap;

dispersing within the hollow interior at the outer surface a particulate filler material the particles of which generally are greater in size than the gap and which, during brazing, are inert to members;

brazing the members; and then removing the particulate filler material.

* * * * *